Oct. 3, 1967   R. J. PURTELL   3,344,991
METHOD AND APPARATUS FOR CLEARING SAND FROM IRRIGATION PIPES
Filed Jan. 3, 1966

INVENTOR:
RUFUS J. PURTELL
BY:

United States Patent Office 3,344,991
Patented Oct. 3, 1967

3,344,991
METHOD AND APPARATUS FOR CLEARING SAND FROM IRRIGATION PIPES
Rufus J. Purtell, Brownfield, Tex., assignor to The J. B. Knight Co., Inc., Brownfield, Tex., a corporation of Texas
Filed Jan. 3, 1966, Ser. No. 518,103
11 Claims. (Cl. 239—1)

This application is a continuation-in-part of earlier filed copending application Ser. No. 351,338 filed Mar. 12, 1964, and now Patent No. 3,272,438.

Under Rule 78, cross reference is made to my prior U.S. patent applications as follows:

Ser. No. 264,507, filed Mar. 12, 1963, Patent No. 3,245,608, dated Apr. 12, 1966; Ser. No. 338,768, filed Jan. 20, 1964, Patent No. 3,245,595, dated Apr. 12, 1966; Ser. No. 351,338, filed Mar. 12, 1964, Patent No. 3,272,-438, dated Sept. 13, 1966.

This application is a continuation-in-part of the Mar. 12, 1964, application. The other two applications have related disclosure.

This invention relates to agricultural sprinkler irrigations systems and more particularly to removing sand from pipes.

In sprinkler irrigation, the water often contains sand or other dense grains or particles of material. These grains settle to the bottom of the pipe when the water velocity is low.

According to this invention, the grains are removed by removing the water from the bottom of the pipe and through a small passageway to a sprinkler. The velocity of water in the passageway is sufficiently high so that the grains do not settle out of the water stream in the passageway.

A plurality of holes are provided around an arc in the bottom periphery of the pipe into the passageway. If a large quantity of sand is injected into the pipe, the passageway below the lower holes may become clogged. However, the turbulence from the increased flow of the holes higher along the arc will agitate the settled grains and introduced them into the flow within the passageway so that they are discharged.

An object of this invention is to remove sand and other granular material from an irrigation sprinkler pipe or other pipe.

Another object is not to restrict the flow of the fluid in the pipe by the removal of the foreign particles.

Another object is to prevent large quantities of sand from clogging passageways.

Further objects are to achieve the above with a device that is sturdy, compact, durable, simple, safe, versatile, and reliable, yet inexpensive and easy to manufacture and operate.

Still further objects are to achieve the above with a method that is raipd, inexpensive, and does not require skilled people to adjust and operate.

The specific nature of the invention, as well as other objects, uses, and advantages thereof, will clearly appear from the following description and from the accompanying drawing, the different views of which are not necessarily to the same scale, in which.

Figure 1:
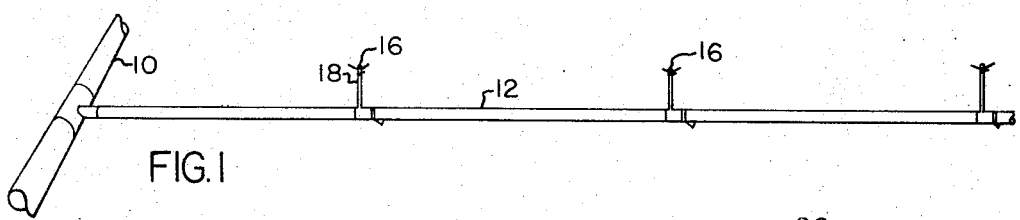
FIG. 1 is a perspective view of an irrigation system according to this invention.
Figure 2:
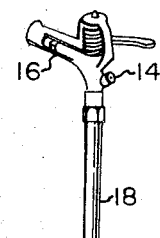
FIG. 2 is a perspective view of a portion of the sprinkler pipe and one sprinkler.

Main pipe 10 carries sand or particle-ladened water under pressure to lateral or sprinkler pipe or conduit 12. The water is discharged from the pipe 12 by discharge openings 14 in sprinklers 16 which are connected by risers 18 to the pipe 12. Each riser 18 is screwed into cuff 20 which is welded over slitted opening 22 in annular protuberances 24 in the pipe 12.

The protuberances 24 are covered by resilient closure bands 26 on the inside to form tore-shaped passageways 28. The bands 26 (preferably made of rubber) have beads 30 on each edge for stiffening and to form a seal with the edges of the protuberance 24. This seal is not critical and, if some water leaks by, it is of little consequence. The bore or inside wall of the pipe 12 is straight and smooth in the area of the bands 26 inasmuch as the bands are flush and smooth with the inside bore. Thus, there are no obstructions nor restrictions nor added friction loss because of bands 26 or because of removing the sand. The cross-sectional area of the passageway 28 and the passageway through the riser 18 is many times smaller and only a fraction of the cross-sectional area of the pipe 12. The water velocity in these passageways is sufficient to prevent any particles or grains of sand from settling out of the water flow.

Figure 3:
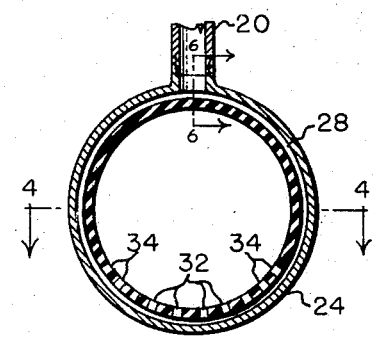
FIG. 3 is a cross-sectional view of the pipe taken on line 3—3 of FIG. 4.
Figure 4:
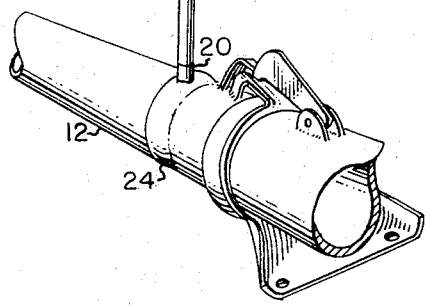
FIG. 4 is an axial-sectional perspective view of the pipe taken on line 4—4 of FIG. 3.
Figure 4:
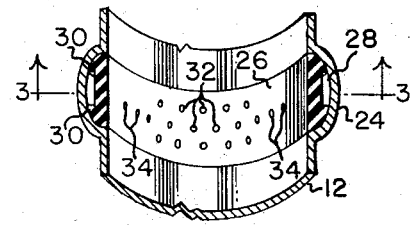
Figure 5:
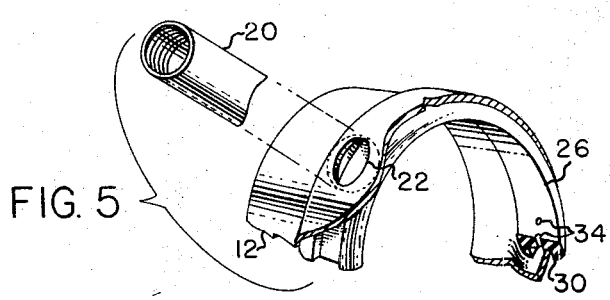
FIG. 5 is an exploded perspective view of the attachment of the riser cuff.
Figure 6:
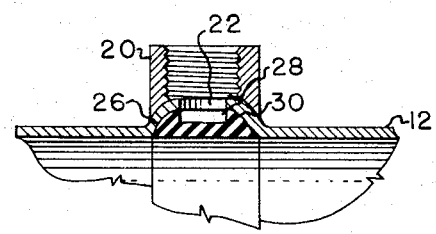
FIG. 6 is an enlarged sectional view taken on line 5—5 of FIG. 3.

The band 26 has a plurality of holes 32 and 34 therethrough, each hole smaller than the cross-sectional area of the passageways and smaller than the discharge opening 14. There are a greater number of the holes 32 in the bottom of the band 26 than the series of holes 34 which extend along the lower sides to a height of a horizontal diameter (line 4—4 of FIG. 3).

In normal operation, any sand in the pipe 10 will be carried by the velocity of the water into pipe 12. Within the pipe 12, the grains or dense particles roll along or are carried along the bottom of the pipe 12. As the water passes through the holes 32 and 34, it carries grains of sand with it through the holes 32, the passageway 28, the riser 18, and discharge opening 14 (all of which are larger than individual holes 32).

If a large quantity of sand is received, it may flow through the holes 32 fast enough to clog the passageway 28 below the holes 32. In such event, the flow through holes 34 will be increased and the turbulence created by the high velocity will agitate the sand adjacent the open hole, thus clearing the clogged sand from the area of the next adjacent hole. The sequence continues until the passageway 28 is entirely clear.

It will be apparent that the embodiment shown is only exemplary and that various modifications can be made in construction, materials, and arrangement within the scope of the invention as defined in the appended claims.

I claim as my invention:

1. The method of removing dense granular particles from a stream of fluid flowing in a conduit comprising removing a portion of the particle-ladened fluid from the bottom of the conduit at a plurality of spaced points, conducting the removed fluid into passageways having a cross-sectional area many times smaller than the cross-sectional area of the conduit; thus maintaining the flow of the removed particle-ladened fluid at a greater velocity within the passageway than within the conduit, and discharging the particle-ladened fluid at a desired location.

2. The invention as defined in claim 1 with the addition of accelerating the particle-ladened fluid as it is removed from the conduit.

3. The invention as defined in claim 1 with the addition of jetting the particle-ladened fluid from the conduit into each of the passageways through a plurality of adjacent holes; thus, if a portion of the holes of the passageway become clogged, the velocity increases through the open holes creating turbulence in the passageways to clear the passageway and to carry the particles on through the passageway.

4. The invention as defined in claim 1 wherein the fluid is discharged by jetting it from a sprinkler onto a field for the purpose of growing plant life.

5. The method of removing sand from an irrigation pipe through a sprinkler mounted on a riser above the pipe comprising:
 (a) accelerating the water with sand in it at the bottom of the pipe to a velocity greater than the velocity of the water in the pipe so that the water carries the sand along with the water stream,
 (b) conducting the water so accelerated upward through a passageway while maintaining the velocity of the sand-bearing water stream at a velocity greater than the velocity of water in the pipe,
 (c) transferring the sand-bearing water from the passageway into the riser, and
 (d) discharging the water with sand through the sprinkler on top of the riser onto the land being irrigated.

6. The method of removing sand from the irrigation pipe through a sprinkler comprising:
 (a) removing a substantial portion of the water from the bottom of the pipe at a plurality of spaced intervals,
 (b) conducting the water removed from the bottom through passageways, each having a cross-sectional area many times smaller than the cross-sectional area of the conduit, thus
 (c) maintaining the velocity of the removed water to a velocity sufficient to carry the sand along with the water, and
 (d) discharging the water with sand through sprinklers onto the land being irrigated.

7. Structure for preventing accumulation of particles of dense material in a fluid system comprising:
 (a) a horizontal pipe adapted to carry particle-ladened fluid under pressure,
 (b) a plurality of discharge openings attached to the pipe,
 (c) a passageway extending from each discharge opening to the bottom of the pipe,
 (d) the pipe having a cross-sectional area several times greater than the cross-sectional area of each passageway,
 (e) a portion of the passageway extending annularly around the bottom of the pipe,
 (f) a plurality of holes from the pipe into the passageway,
 (g) each of the plurality of holes from the pipe into the passageway being smaller than each of said discharge openings,
 (h) a greater number of holes at the bottom of the pipe than along the sides or top of the pipe,
 (j) some of the holes extending serially up the sides of the pipe, and
 (k) the flow through the holes in the side of the pipe being increased upon a clogged condition in the holes at the bottom of the pipe so as to agitate the sand in the passageway adjacent the holes at the bottom.

8. The invention as defined in claim 7 wherein
 (f) the pipe has a straight, unrestricted, and unobstructed bore at the area the passageway enters the pipe.

9. The invention as defined in claim 7 wherein
 (f) the discharge opening is in a sprinkler located
 (g) on top or a riser which
 (h) is attached to the top of the pipe.

10. The invention as defined in claim 7 wherein
 (f) a portion of each passageway is tore-shaped,
 (g) defined by an annular protuberance in the wall of the pipe, and
 (h) a cylindrical closure band on the inside of the protuberance and
 (j) the hole from the pipe to the passageway is through the closure band.

11. The invention as defined in claim 10 wherein
 (k) said closure band is made of rubber with a bead on each edge.

References Cited
UNITED STATES PATENTS

| | | | |
|---|---|---|---|
| 2,196,456 | 4/1940 | Charroin | 239—547 |
| 2,270,089 | 1/1942 | Stout | 285—5 |
| 2,741,510 | 4/1956 | McCulloch | 137—344 |
| 2,796,292 | 6/1957 | Maggart | 239—213 |
| 3,163,361 | 12/1964 | Stout | 239—212 |
| 3,193,204 | 7/1965 | Walton et al. | 285—190 |
| 3,272,438 | 9/1966 | Purtell | 239—212 |

M. HENSON WOOD, JR., *Primary Examiner.*

R. S. STROBEL, VAN C. WILKS,
*Assistant Examiners.*